United States Patent
Serafimovich et al.

(10) Patent No.: US 7,697,079 B2
(45) Date of Patent: Apr. 13, 2010

(54) ILLUMINATION SYSTEM ELIMINATING LASER SPECKLE AND PROJECTION TV EMPLOYING THE SAME

(75) Inventors: Pavel Serafimovich, Suwon-si (KR); Sungha Kim, Seoul (KR); Byoungho Cheong, Seoul (KR); Sangwhoe Dho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1178 days.

(21) Appl. No.: 11/282,680

(22) Filed: Nov. 21, 2005

(65) Prior Publication Data

US 2006/0109553 A1 May 25, 2006

(30) Foreign Application Priority Data

Nov. 19, 2004 (KR) .................... 10-2004-0095048

(51) Int. Cl.
*H04N 9/31* (2006.01)
*G02B 13/08* (2006.01)

(52) U.S. Cl. ..................... 348/744; 362/368
(58) Field of Classification Search .............. None
See application file for complete search history.

(56) References Cited

U.S. PATENT DOCUMENTS

| | | | | |
|---|---|---|---|---|
| 4,918,469 A * | 4/1990 | McGrew | ............... | 359/22 |
| 6,323,984 B1 * | 11/2001 | Trisnadi | ............... | 359/245 |
| 6,594,090 B2 * | 7/2003 | Kruschwitz et al. | ......... | 359/707 |
| 6,688,758 B2 * | 2/2004 | Thibault | ............... | 362/368 |
| 6,744,502 B2 * | 6/2004 | Hoff et al. | ............... | 356/317 |
| 7,128,420 B2 * | 10/2006 | Kapellner et al. | ............... | 353/38 |
| 7,244,028 B2 * | 7/2007 | Govorkov et al. | ............... | 353/37 |
| 7,355,657 B2 * | 4/2008 | Chilla et al. | ............... | 348/744 |
| 7,379,651 B2 * | 5/2008 | Abu-Ageel | ............... | 385/146 |
| 2003/0227684 A1 * | 12/2003 | Goto | ............... | 359/566 |
| 2004/0160998 A1 | 8/2004 | Gruhlke et al. | | |
| 2006/0012842 A1 * | 1/2006 | Abu-Ageel | ............... | 359/196 |
| 2006/0109386 A1 * | 5/2006 | Serafimovich et al. | ...... | 348/744 |
| 2007/0273957 A1 * | 11/2007 | Zalevsky et al. | ............... | 359/326 |

FOREIGN PATENT DOCUMENTS

KR    2003-0003273 A    1/2003

OTHER PUBLICATIONS

Wang et al.: "Speckle Reduction in Laser Projection Systems by Diffractive Optical Element" Applied Optics, vol. 37, No. 10, Apr. 1998, pp. 1770-1775.

* cited by examiner

*Primary Examiner*—Paulos M Natnael
(74) *Attorney, Agent, or Firm*—Sughrue Mion, PLLC

(57) ABSTRACT

Provided are an illumination system and a projection TV employing the same. The illumination system includes: a laser light source including a plurality of lasers which emit laser beams including a plurality of beamlets; a first diffractive optical element which separates the laser beams according to wavelength and which focuses the separated beams onto different segments of a second refractive optical element; and the second diffractive optical element which focuses and superimposes a plurality of beamlets, of the laser beams transmitted by the first diffractive optical element, in order to spatially average the laser beams and to eliminate laser speckle.

9 Claims, 7 Drawing Sheets

ILLUMINATION SYSTEM ELIMINATING LASER SPECKLE AND PROJECTION TV EMPLOYING THE SAME

This application claims the priority of Korean Patent Application No. 10-2004-0095048, filed on Nov. 19, 2004, in the Korean Intellectual Property Office, the disclosure of which is incorporated herein in its entirety by reference.

BACKGROUND OF THE INVENTION

1. Field of the Invention

The present invention relates to an illuminating system designed to eliminate speckles of laser light and a projection TV employing the same, and more particularly, to an illumination system designed to efficiently reduce or eliminate laser speckles by spatially averaging laser beams using a diffractive optical element and a projection TV employing the same.

2. Description of the Related Art

A projection TV using a laser light source unit is capable of providing a wide range of color expression and has a small divergence angle and high optical efficiency due to a superior collimating property, and thus can have a small size. However, in addition to these advantages, projection televisions utilizing laser light sources suffer from speckles of laser light due to the coherency of the laser light. Speckles of laser light are generated due to the interference with an arbitrary phase when coherent beams are reflected from a rough surface. Such speckles of laser light are the main factor in the degradation of the resolution and of the quality of images.

U.S. Pat. No. 6,594,090 discloses a conventional projector that can remove laser speckles.

Referring to FIG. 1, the conventional projector includes a laser light source 20, a beam expanding optical unit 24, a diffuser 34, and a beam shaping optical unit 38, which are coaxially arranged. The beam expanding optical unit 24 includes a diverging lens 26 and a collimating lens 30. The beam shaping optical unit 38 includes a fly's eye integrator 40, a condenser lens 44, and a field lens 46.

The beam expanding optical unit 24 expands beams emitted from the laser light source 20 into collimated beams with larger diameters. The beam shaping optical unit 38 shapes the beams with Gaussian distributions to have uniform intensity distributions by overlapping the expanded beams and adjusts the shapes of the beams to match with the shape of a liquid-crystal spatial light modulator 52. The beam reflected by the liquid-crystal spatial light modulator 52 is reflected by a polarizing beam splitter 50 and is enlarged and projected onto a screen 60 by a projection lens 58, so that an image is displayed on the screen 60.

In the conventional structure, the beams diffused by the diffuser 34 are radiated by the beam shaping optical unit 38 toward the spatial light modulator 52 such that they overlap, thereby eliminating laser speckles. However, eliminating laser speckles only using the diffuser 34 as described above results in low speckle removing efficiency and a degraded image quality.

SUMMARY OF THE INVENTION

The present invention provides a slim and compact illumination system using a laser light source unit that can effectively reduce or eliminate laser speckles using a diffractive optical element, and a projection TV employing the same.

According to an exemplary aspect of the present invention, there is provided an illumination system comprising: a laser light source including a plurality of lasers which emit laser beams including a plurality of beamlets; a first diffractive optical element which separates the laser beams according to wavelength and which focuses the separated beams onto different segments of a second diffractive optical element; and the second diffractive optical element which focuses and superimposes a plurality of beamlets, of the laser beams transmitted by the first diffractive optical element, in order to spatially average the laser beam and to eliminate laser speckle.

The plurality of lasers may emit beams along the same optical axis.

The first diffractive optical element may focus the laser beams emitted by the laser light source so that the focused beams have concentric annular profiles.

The second diffractive optical element may have diffractive patterns corresponding to the different segments onto which the separated beams are focused.

The second diffractive optical element may shape the cross-section of the laser beams transmitted by the first diffractive optical element into a predetermined shape.

According to another exemplary aspect of the present invention, there is provided a projection television comprising: a laser light source unit including a plurality of lasers which emit laser beams including a plurality of beamlets; a first diffractive optical element which separates the laser beams according to wavelength and which focuses the separated beams onto different segments of a second diffractive optical element according to wavelength; the second diffractive optical element which focuses and superimposes a plurality of beamlets, of the laser beams transmitted by the first diffractive optical element, in order to spatially average the laser beams and to eliminate laser speckle; a display device which forms an image using the laser beams transmitted by the second diffractive optical element; and a projection lens unit which enlarges and projects the image onto a screen.

BRIEF DESCRIPTION OF THE DRAWINGS

The above and other features and advantages of the present invention will become more apparent with reference to the following detailed description with reference to the attached drawings in which.

DETAILED DESCRIPTION OF THE INVENTION

Figure 1:
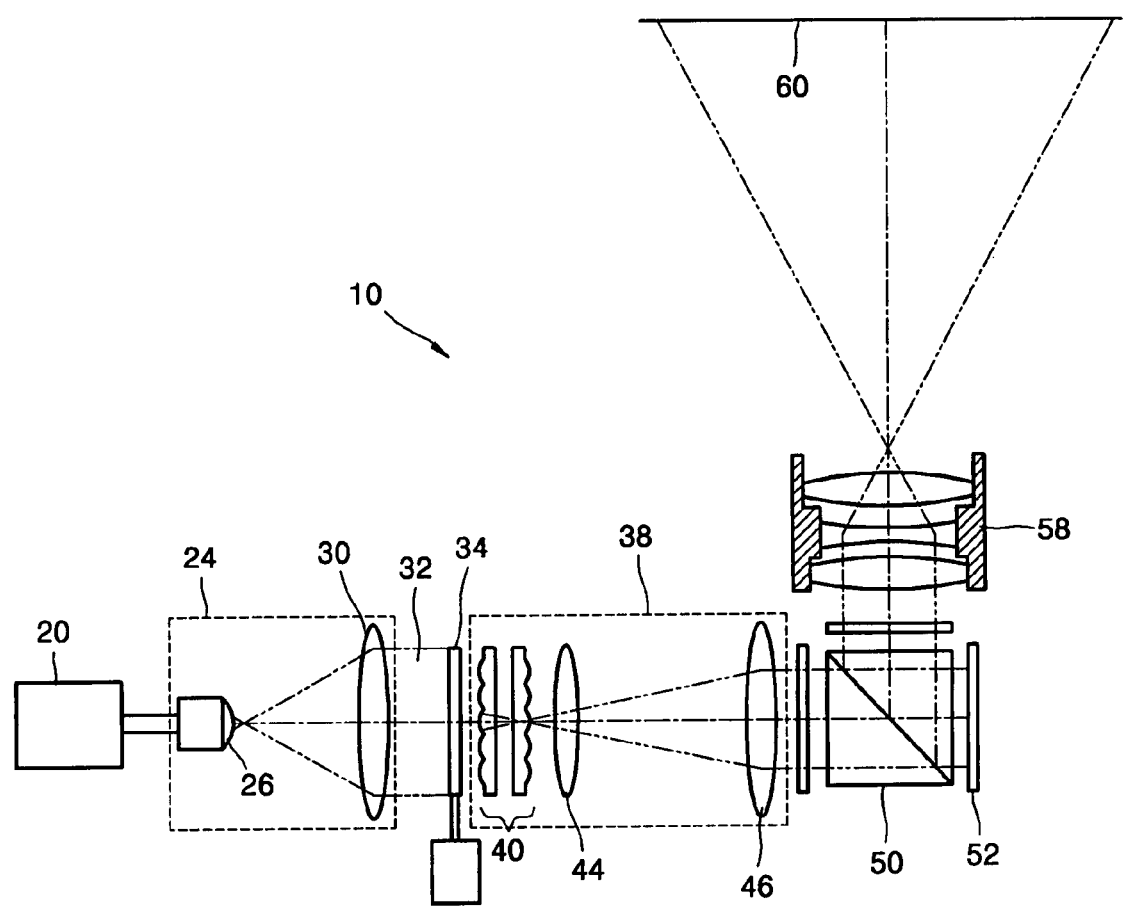
FIG. 1 illustrates a conventional projector disclosed in U.S. Pat. No. 6,594,090.
Figure 2:
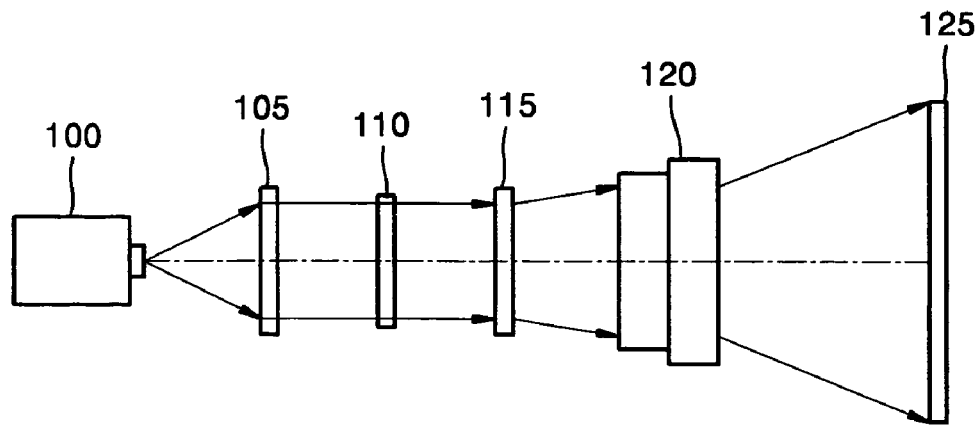
FIG. 2 is a schematic diagram illustrating a structure of a projection TV according to an exemplary embodiment of the present invention.

Referring to FIG. 2, a projection TV according to an exemplary embodiment of the present invention includes a laser light source unit 100, a first diffractive optical element 105 which focuses a laser beam emitted from laser light source unit 100 onto different positions according to wavelengths, a second diffractive optical element 110 which eliminates speckles of a laser beam, and a display device 115 which spatially modulates an incident beam to produce an image. The projection TV further includes a projection lens unit 120 which enlarges and projects the image produced by the display device 115 onto a screen 125.

The first diffractive optical element 105 diffracts the laser beam at different divergence angles according to wavelength and focuses the diffracted beams onto different positions of the second diffractive optical element 110. For example, referring to FIG. 3, the first diffractive optical element 105 separates an incident beam into three concentric annular beams according to wavelength and focuses them onto first through third color beam segments L1 through L3 of the second diffractive optical element 110. Here, first through third color beams may be red, green, and blue beams, respectively.

Figure 4A:
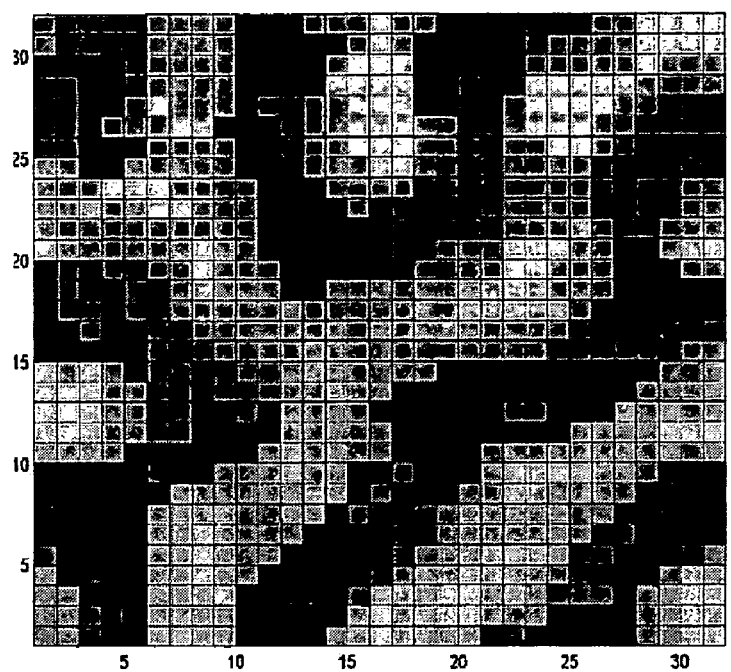
FIG. 4A is an example of a mask pattern of a first diffractive optical element in a projection TV according to the present invention.
Figure 4B:
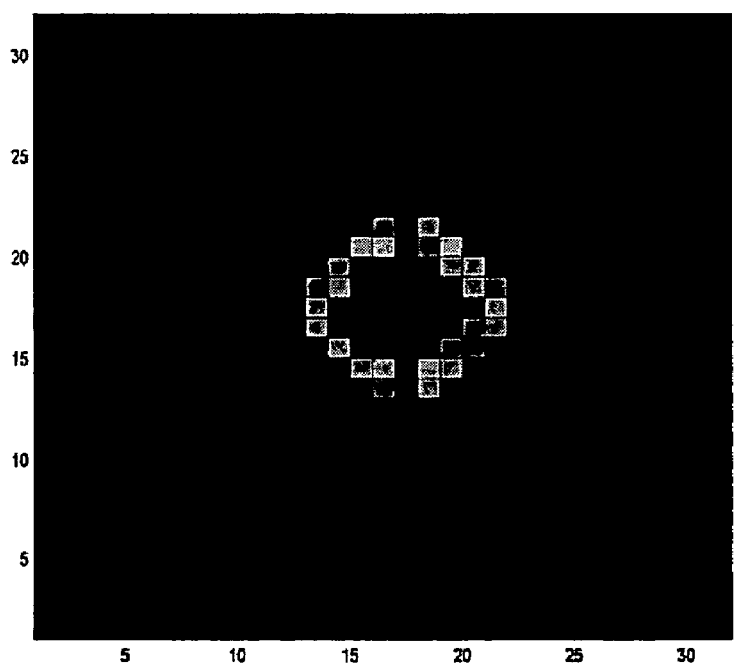
FIG. 4B illustrates an exemplary beam image converted by the first diffractive optical element shown in FIG. 4A.

The first diffractive optical element 105 may be designed to separate an incident beam and to eliminate speckle of a laser beam. FIG. 4A is an example of a mask pattern of the first diffractive optical element 105, and FIG. 4B illustrates an annular beam image produced by the first diffractive optical element 105. The energy efficiency of the first diffractive optical element 105 may vary with a distance between the first and second diffractive optical elements 105 and 110. Annular beams do not overlap each other since this degrades the energy efficiency of the first diffractive optical element.

Figure 3:
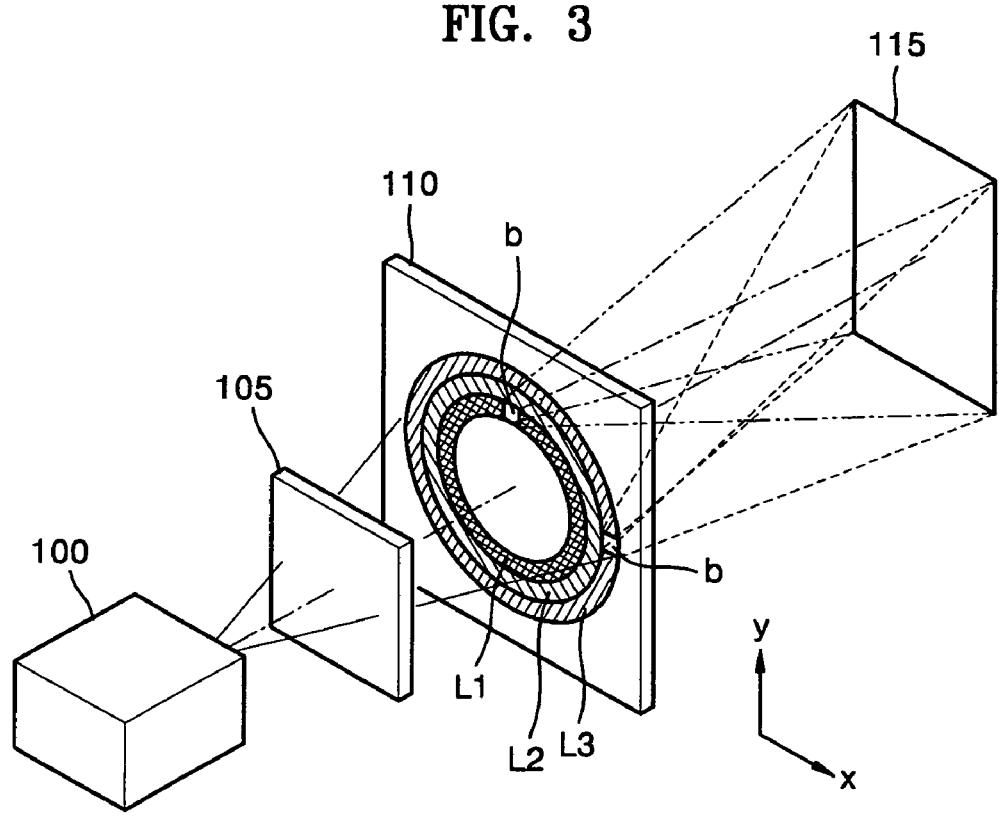
FIG. 3 illustrates an illumination system according to an exemplary embodiment of the present invention.

Referring to FIG. 3, the second diffractive optical element 110 is disposed in an optical path between the first diffractive optical element 105 and a display device 115 and shapes the incident beams such that a cross-section of each of the beams matches the shape of the display device 120. The second diffraction optical element 110 spatially averages the incident beams by overlapping the incident beams on the display device 120, thereby eliminating speckles of the laser beams. In other words, the beams incident on the second diffractive optical element 110 include multiple beamlets b, and each of the beamlets b is shaped to correspond to the shape of the display device 115 so that the beamlets b overlap on the display device 120. As a result, the beams are spatially averaged, thereby markedly removing or eliminating speckles of the laser beams.

A laser beam is focused by the first diffractive optical element onto a plurality of segments on the second diffractive optical element 110 according to wavelength. The second diffractive optical element 110 may have optimized diffraction patterns corresponding to the respective color beam segments L1 through L3. Since the light transmittance of a diffractive optical element depends on the wavelength of an incident beam, diffraction efficiency for each color can be maximized by designing the second diffractive optical element 105 with diffraction patterns optimized according to wavelengths of the respective color beams. Furthermore, the second diffractive optical element 110 with optimal diffraction patterns can focus each color beam precisely on the display device 115.

Figure 5A:
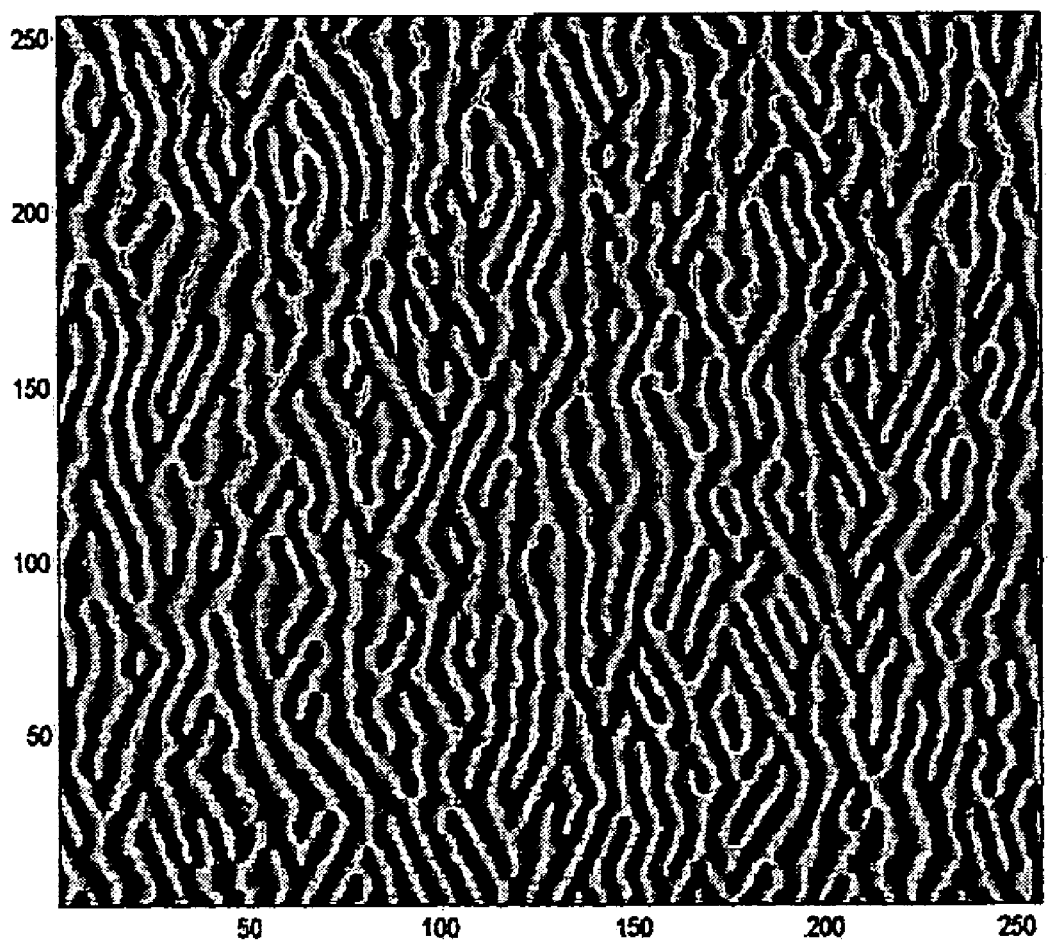
FIG. 5A shows an exemplary fragment in the X-axis direction for a red beam segment of a second diffractive optical element in a projection TV according to the present invention.
Figure 5B:
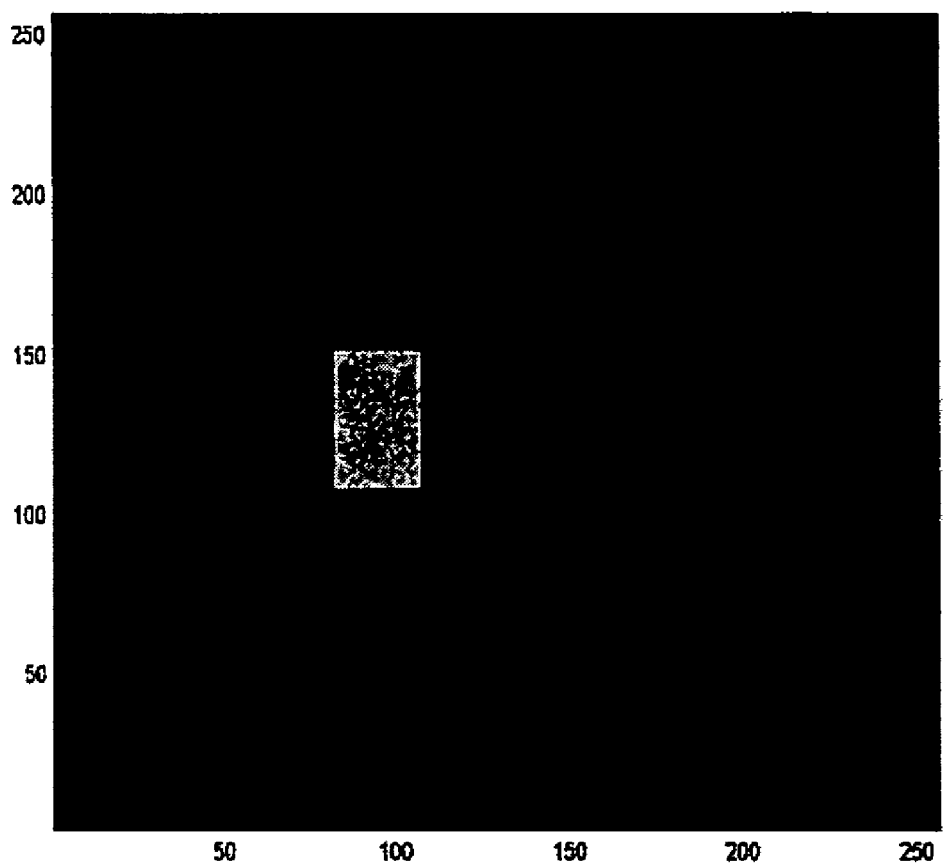
FIG. 5B illustrates an exemplary beam image converted by the fragment in the X-axis direction shown in FIG. 5A and an exemplary light intensity distribution.
Figure 5B:

FIG. 5A shows a fragment in the X-axis direction for the red beam segment L1 of the second diffractive optical element. The fragment has 256×256 pixels, 43×25 beamlets, RMS of 3.2%, and diffraction efficiency of 90.0%. FIG. 5B illustrates an image focused on the display device 115 by the fragment of the second diffractive optical element 110 shown in FIG. 5A and a light intensity distribution in the image. As evident from FIG. 5B, the light intensity distribution in the X-axis direction is almost uniform.

Figure 6A:
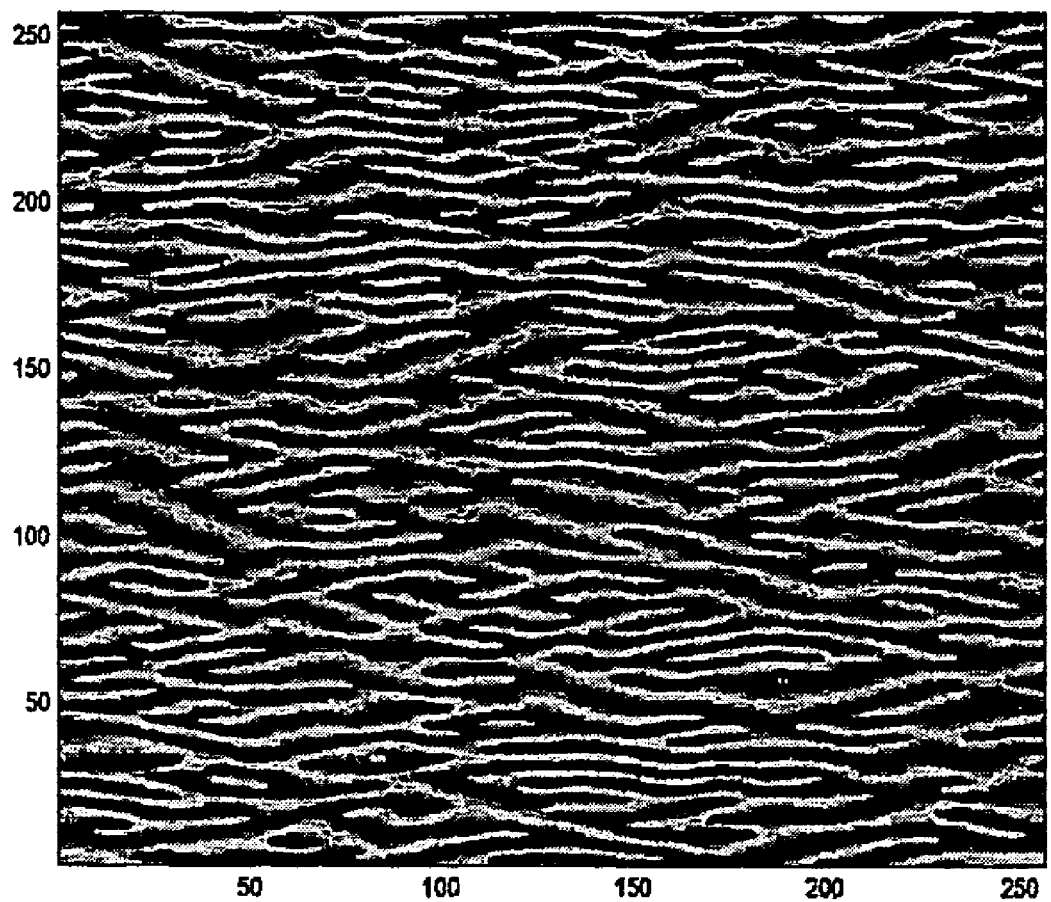
FIG. 6A shows an exemplary fragment in the Y-axis direction for a red beam segment of a second diffractive optical element in a projection TV according to the present invention.
Figure 6B:
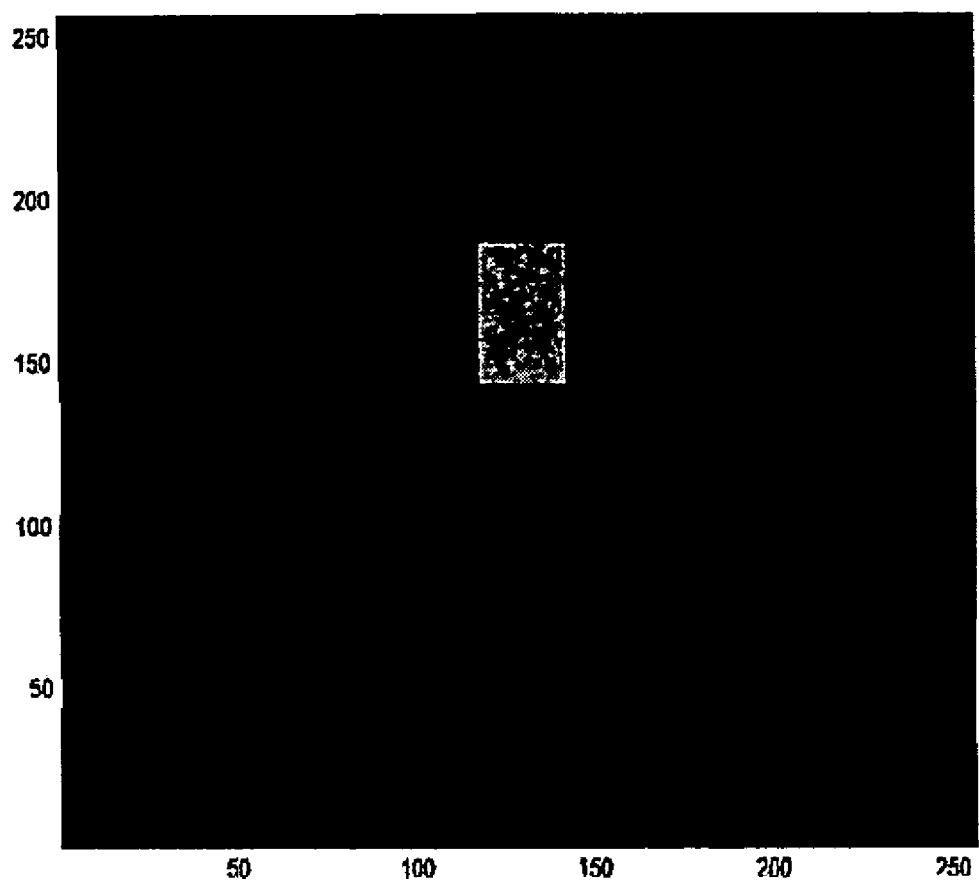
FIG. 6B illustrates an exemplary beam image converted by the fragment in the Y-axis direction shown in FIG. 6A and an exemplary light intensity distribution.
Figure 6B:
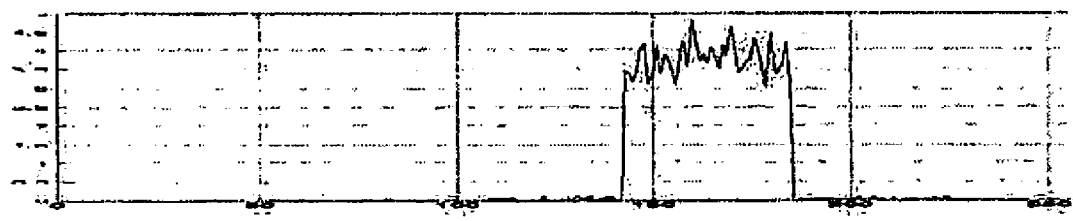

FIG. 6A shows a fragment in the Y-axis direction for the red beam segment L1 of the second diffractive optical element 110. The fragment has 256×256 pixels, 43×25 beamlets, RMS of 3.1%, and diffraction efficiency of 90.0%. FIG. 6B illustrates an image focused on the display device 115 by the fragment shown in FIG. 6A and a light intensity distribution in the image. As evident from FIG. 6B, the light intensity distribution in the Y-axis direction is almost uniform. Although not shown, beams for the green and blue segments L2 and L3 respectively have a square (uniform) intensity distribution similar to that for the red beam segment L1.

A beam focused on the display device 115 by the second diffractive optical element 110 has a square intensity distribution in both the X- and Y-axis directions. This is achieved by spatially averaging a laser beam and significantly reducing or eliminating speckle of the laser beam.

The contrasts of laser speckles are expressed by Equation (1) below. When the contrast of a laser speckle is 4% or less, the laser speckle is invisible.

$$C = \frac{\sqrt{<I_i^2> - <I_i>^2}}{<I_i>} = \frac{\sigma}{\mu} \times 100\,(\%) \tag{1}$$

where $I_i$ is an average intensity of a beam passing through an i-th pixel of the diffractive optical element, $\sigma$ is the standard deviation of the intensity values, and $\mu$ is the mean value of the intensity values.

The beams with Gaussian distributions emitted from the laser light source unit 100 are converted into beams with uniform (square) intensity distributions as they pass through the second diffractive optical element 110. The second diffractive optical element 110 converts the Gaussian beams into uniform intensity beams by focusing the beams onto the display device 115 where the uniform intensity beams overlap. As a result, a laser speckle-free, high quality image can be obtained.

Also, the second diffractive optical element 110 shapes the cross-section of the beam to match the shape of the display device 115. The display device 115 may be a transmissive liquid crystal display (LCD), a liquid crystal on silicon (LCoS) display, a deformable micromirror device (DMD), a grating light valve (GLV), or another display device as would be understood by one of skill in the art. The display device 115 has a rectangular shape with an aspect ratio of 4:3 or 16:9. To achieve high optical efficiency, there a beam having a circular cross-section emitted from the laser light source unit 100 may be shaped to match the shape of the display device 115. Thus, the laser beams emitted from the laser light source unit 100 are shaped such that, after passing through the second diffractive optical element 110, they match the shape of the display device 115.

The diffractive pattern of the second diffractive optical element 110 can be varied to control the divergence angle of an incident beam. By controlling the divergence angle of the incident beam in such a way to increase the F-number of an illumination system, a small-sized projection TV can be manufactured. The beams shaped by the second diffractive optical element 110 are incident on the display device 115, and an image produced by the display device 115 is enlarged and projected onto the screen 125 by the projection lens unit 120.

The laser light source unit 100 includes a plurality of lasers which simultaneously emit color beams with different wavelengths along the same optical axis. For example, the laser light source unit 100 may include first through third lasers respectively emitting red, green, and blue beams. Images corresponding to the red, green, and blue beams are simultaneously produced by a three-panel display device and are projected onto the screen 125 in order to produce a color image. Alternatively, in order to produce a color image, images corresponding to the respective color beams sequentially emitted from the laser light source unit 100 may be produced sequentially by a single-panel display device and may then be projected onto the screen 125.

According to the present invention, an illumination system that can markedly reduce or eliminate speckles of laser beams is used as a laser light source unit, and a higher-quality projection TV employing the illumination system is provided.

According to the present invention, by minimizing the divergence of a beam using the laser light source unit, a compact and slim projection TV can be manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illumination system comprising:
   a laser light source including a plurality of lasers which emit laser beams including a plurality of beamlets;
   a first diffractive optical element which separates the laser beams according to wavelength and which focuses the separated beams onto different segments of a second diffractive optical element; and
   the second diffractive optical element which focuses and superimposes the plurality of beamlets of the laser beams transmitted by the first diffractive optical element, in order to spatially average the laser beams and to eliminate laser speckle,
   wherein the first diffractive optical element focuses the laser beams emitted by the laser light source so that the focused beams have concentric annular profiles.

2. The system of claim 1, wherein the plurality of lasers emit the laser beams along the same optical axis.

3. The system of claim 1, wherein the second diffractive optical element comprises diffractive patterns corresponding to the different segments onto which the separated beams are focused.

4. The system of claim 1, wherein the second diffractive optical element shapes the cross-section of the laser beams transmitted by the first diffractive optical element into a predetermined shape.

5. A projection television comprising:
   a laser light source unit including a plurality of lasers which emit laser beams including a plurality of beamlets;
   a first diffractive optical element which separates the laser beams according to wavelength and which focuses the separated beams onto different segments of a second diffractive optical element according to wavelength;
   the second diffractive optical element which focuses and superimposes the plurality of beamlets of the laser beams transmitted by the first diffractive optical element, in order to spatially average the laser beams and to eliminating laser speckle;
   a display device which forms an image using the laser beams transmitted by the second diffractive optical element; and
   a projection lens unit which enlarges and projects the image onto a screen,
   wherein the first diffractive optical element focuses the laser beams emitted by the laser light source so that the focused beams have a concentric annular profiles.

6. The television of claim 5, wherein the plurality of lasers emit the laser beams along the same optical axis.

7. The television of claim 5, wherein the second diffractive optical element comprises diffractive patterns corresponding to the different segments onto which the separated beams are focused.

8. The television of claim 5, wherein the second diffractive optical element shapes the cross-section of the laser beams transmitted by the first diffractive optical element to match the cross-section of the display device.

9. The television of claim 5, wherein the display device is one selected from the group consisting of a transmissive liquid crystal display, a liquid crystal on silicon display, a deformable micromirror device, and a grating light valve.

\* \* \* \* \*